3,265,608
METHOD FOR PYROLYZING SOLID CARBONACEOUS MATERIALS
Clarence L. Crawford, Los Angeles, Calif., assignor, by mesne assignments, to Technikoil, Inc., Cleveland, Ohio, a corporation of Ohio
Filed Feb. 2, 1962, Ser. No. 170,738
23 Claims. (Cl. 208—11)

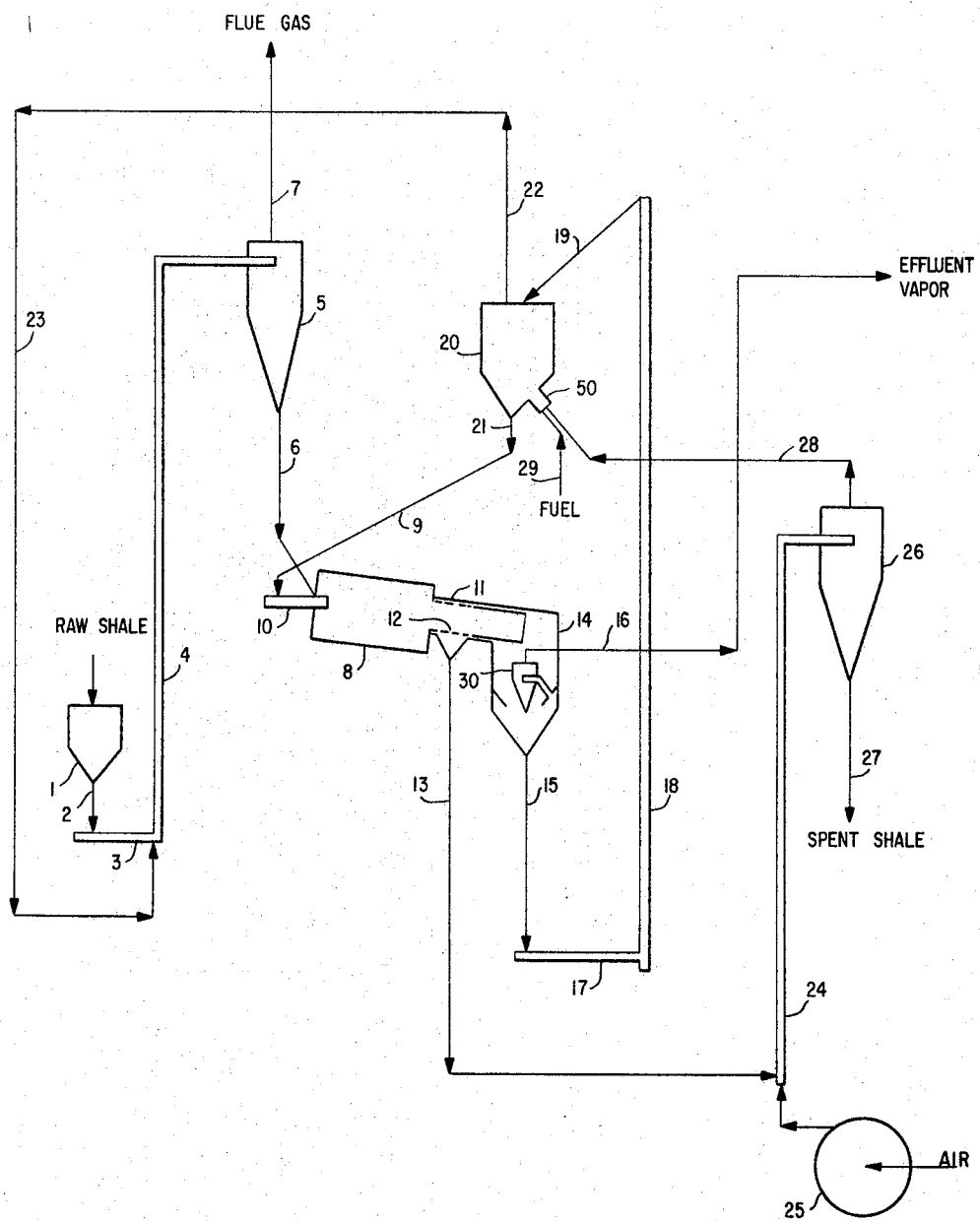

This invention relates to the production of oil from solid carbonaceous materials and more particularly to a process for economically producing oil from oil shale, bituminous sands, peat, and the like wherein solid heat-carrying bodies are utilized in thermally treating the carbonaceous solids in a horizontal rotating pyrolysis drum.

Hydrocarbon values resident in solid carbonaceous materials such as oil shale, bituminous sands, coals, and the like generally are recovered therefrom by a method wherein the carbonaceous solids are thermally treated to provide an effluent vapor, and the effluent vapor subsequently is condensed with the resultant formation of a hydrocarbon oil. Accompanying the production of the effluent vapor in such thermal treatments of carbonaceous solids is the formation of hot solid residual materials which contain combustible carbon. Such residues are referred to hereinafter in the specification and claims as "spent material" or "spent solids."

Various techniques are available for thermally treating solid carbonaceous materials in order to recover the desired hydrocarbon values therefrom. One technique involves directly contacting the carbonaceous solids in a pyrolysis zone with hotter heat-carrying bodies whereby heat is transferred to the carbonaceous solids, and pyrolysis of the solids is effected thereby. In such processes utilizing heat-carrying bodies, the bodies prior to being introduced into the pyrolysis zone must be heated, or as in the case of continuous processes, reheated to pyrolysis zone temperatures.

Heat for raising the temperature of such heat-carrying bodies to pyrolysis zone temperatures may be obtained from sources either outside and/or inside the process in which the bodies are employed. Since sufficient heat is available from sources within the process, it usually is impractical to utilize heat from external sources. Accordingly, it is conventional practice in the processes for recovering oil from carbonaceous solids to employ essentially only heat available from products produced in the pyrolysis of the solids.

As stated hereinabove, spent solids obtained by the pyrolysis of solid carbonaceous materials contain fixed but combustible carbon. Since the spent solids issuing from the pyrolysis zone are at pyrolysis temperatures the spent solids obtained in processes for recovering oil from solid carbonaceous materials are characterized by both sensible and combustion heat value. The heat value of the hot spent materials provides a potential source for reheating heat-carrying bodies employed in pyrolyzing the raw carbonaceous feeds. The maximum of the heat value potentially available in the hot spent solid materials can be recovered in the oil recovery process by combusting the carbon-containing spent material and contacting the heat-carrying bodies with the resultant hot combustion products. The use of such a technique in recovering oil from solid carbonaceous materials is described in Aspegren U.S. Patent No. 3,025,223. The combustible residues formed by pyrolysis of different carbonaceous materials, and particularly different oil shales, are characterized by a varying content of combustible carbon. It follows, therefore, that in the choice of a pyrolysis process for a particular shale it is necessary to take into consideration the varying combustion heat availability. In some instances it may prove more economical not to employ the combustion heat of the pyrolysis residue in reheating heat-carrying bodies, particularly where the combustion process employed is characterized by high power requirements and necessitates a large capital investment for equipment.

In order to warrant the utilization of a combustion step in reheating heat-carrying bodies by means of combustion heat available in low-carbon spent materials, it has been suggested to increase the proportion of combustible matter by effecting, in situ, at least partial coking of the hydrocarbon produced in the pyrolysis zone. However, coking in the pyrolysis zone, to the extent necessary to substantially raise the carbon content of the pyrolysis residue, is in itself unsatisfactory due, inter alia, to the production of noncondensible gases which dilute the desirable effluent vapor and complicate oil recovery.

Accordingly, it is the primary object of the present invention to provide a method for extracting oil from solid carbonaceous materials wherein pyrolysis of the carbonaceous solids is effected efficiently and economically by means of heat-carrying bodies.

It is another object of the present invention to provide a method for extracting oil from solid carbonaceous materials wherein pyrolysis of the carbonaceous solids is effected by means of heat-carrying bodies and the heat requisite for the pyrolysis is obtained completely from sources within the oil extraction process.

It is an additional object of the present invention to provide a method for thermally treating solid carbonaceous materials with hotter heat-carrying bodies to effect the pyrolysis of the carbonaceous solids wherein the heat-carrying bodies are raised to pyrolysis zone temperatures by means of heat obtained from products produced by the pyrolysis without combusting pyrolysis spent solids.

It is a further object of the present invention to provide a method for thermally treating solid carbonaceous materials with hotter heat-carrying bodies to effect the pyrolysis of the carbonaceous solids wherein the heat of the heat-carrying bodies is supplied by the sensible heat of pyrolysis spent solids and the combustion heat of a portion of the vaporous effluent produced in the process.

Yet another object of the present invention is a process for pyrolyzing solid carbonaceous materials with heat-carrying bodies heated by means of heat obtained from products produced in the process which process does not require an uneconomic handling of materials.

It is yet an additional object of the present invention to provide a method for thermally treating solid carbonaceous materials with hotter heat-carrying bodies to effect the pyrolysis of the carbonaceous solids to provide valuable effluent oil vapor and spent solids which economically can be employed to impart the requisite heat for the pyrolysis to the heat-carrying bodies without the necessity of combusting the spent solids.

It is a particular object of the present invention to provide a method for pyrolyzing oil shales which on pyrolysis produce a residue having low combustible carbon content, wherein highly economic yields of shale oil are achieved and the heat requisite for the pyrolysis of the shale is obtained from products produced in the process without combustion of the pyrolysis residues.

Broadly described, the present invention provides a method for producing an effluent vapor from a solid carbonaceous material leaving, upon pyrolysis, a spent solid residue, which comprises the steps of: pyrolyzing said solid material in a pyrolysis zone by solid-to-solid milling contact with hotter heat-carrying bodies to obtain effluent vapor and hot spent solids; recovering said effluent vapor from said pyrolysis zone; separating said hot spent solids from said heat-carrying bodies; transferring said heat-carrying bodies to a pebble heater; heating said heat-carrying bodies in said pebble heater by means of heat derived from said hot spent solids under non-combustion conditions and heat derived by combusting fuel and recirculating said heated heat-carrying bodies to said pyrolysis zone to effect the pyrolysis of fresh solid carbonaceous material introduced thereinto.

One embodiment of the present invention provides a method for producing effluent vapor from a solid carbonaceous material leaving, upon pyrolysis, a spent solid residue, which comprises the steps of: pyrolyzing said solid material in a pyrolysis zone by solid-to-solid milling contact with hotter heat-carrying bodies to obtain effluent vapor and hot spent solids smaller in average diameter than said heat-carrying bodies; recovering said effluent vapor from said pyrolysis zone; separating said hot spent solids from said heat-carrying bodies; transferring said heat-carrying bodies to a pebble heater; entraining at least a part of said hot spent solids in a gas lift zone with a cooler combustion supporting gas, said gas being heated thereby; separating said spent solids in an unburned state from said heated combustion-supporting gas; combusting a portion of said effluent vapor produced upon the pyrolysis of said solid carbonaceous material with said heated gas to produce a hot flue gas; passing said hot flue gas through said pebble heater to thereby heat said heat-carrying bodies therein; and recirculating said heated heat-carrying bodies to said pyrolysis zone to effect the pyrolysis of fresh solid carbonaceous material introduced thereinto.

The carbonaceous materials contemplated for treatment by the method of the invention embrace any solid carbonaceous materials containing hydrocarbon values which can be recovered by a thermal treatment. Such solid materials which suitably may be treated by the method of the invention include, without limitation, oil shales, bituminous sands, lignites, coals, such as brown coal, peat and the like. Carbonaceous solids yielding pyrolysis residues of low available carbon content are particularly adapted to be treated by the method of the invention, although carbonaceous solids yielding pyrolysis residues of high carbon content advantageously may be treated. The most economical results are obtained in the process of the invention when the feed material is characterized by a pyrolysis residue having a combustible carbon content between about two and about five percent. Oil shale deposits found in the United States usually are characterized by a recoverable oil content of about 20–50 gallons per ton of shale and upon essentially complete pyrolysis thereof, in addition to the oil vapors and non-condensible gases produced thereby, a solid residue is produced having a fixed carbon content of about 3% by weight. Such oil shales constitute excellent raw materials for the process of the invention.

The solid heat-carrying bodies contemplated to be utilized in the method of the invention embrace any solids made up of materials which have a relatively high rate of heat conductivity and which are inert and maintain their physical characteristics under the conditions employed in the process to effect the pyrolysis of the solid carbonaceous materials. More specifically, the bodies should consist of materials which do not decompose, melt or fuse at temperatures encountered in the pyrolysis and heat-carrying body reheating zones. In addition, it is preferred that the bodies themselves do not disintegrate to any appreciable extent when subjected to the physical and thermal stresses inherent in the process. It will be understood, of course, that in this respect disintegration is to be distinguished from normal gradual wear by attrition.

Suitable materials for use in preparing the heat-carrying bodies include, without limitation, iron, steel, alumina, ceramic compositions, spent ash and the like. It will be understood that as employed hereinafter in the specification and claims the term "spent ash" is meant to refer to the solid residual material remaining after the solid residue (spent material) produced in the pyrolysis of carbonaceous solids is burned to remove at least a portion of any combustible substances present therein. For example, hereinafter in the specification and claims, the solid residue produced in the partial or complete pyrolysis of oil shale is referred to as "spent shale" and the residual solid material remaining after spent shale is burned to combust any fixed carbon therein is referred to as "spent shale ash." In the case of materials, such as alumina and spent ash, which may be compressed into shapes and fired to form suitable heat-carrying bodies, these materials suitably may be combined with other additives which impart to the fired bodies improved properties such as compression strength and resistance to thermal shock. All of the heat-carrying bodies employed in a particular embodiment of the method of the invention may be made up of the same material. Alternatively, mixtures of bodies composed of dissimilar materials suitably may be employed.

The materials preferred for utilization in making heat-carrying bodies to be employed in pyrolyzing a particular type of carbonaceous solid in a specific embodiment of the present method, of course, will depend upon a consideration of the over-all economics of that process. When oil shales are to be treated in accordance with the present method, the heat-carrying bodies which are particularly preferred for use are formed of alumina due to the high heat conductivity, wearing qualities during the solid-to-solid milling contact characterizing the process, and inertness of such bodies.

The heat-carrying bodies should be at least roughly spherical to facilitate their movement through the system and to achieve maximum efficiency in solid-to-solid heat transfer zones. Bodies preferred for use in the process are in the form of balls.

In the method of the invention the raw solid carbonaceous material desired to be thermally treated initially is crushed by any suitable method to be of a suitable particle size. Preferably the raw carbonaceous material is reduced in particle size to be of such an average diameter that it is of a smaller value than that of the heat-carrying bodies employed, so that separation of the spent material produced in the pyrolysis and the heat-carrying bodies readily can be accomplished. Usually the average particle size of the raw carbonaceous solid feed stream is in the range of from about ⅜" to about ¾" and preferably is about ½". The crushed raw carbonaceous material at ambient temperatures then may be passed directly to the pyrolysis zone, although it is preferred that the raw solids feed stream be preheated.

Preheating of the crushed material suitably may be carried out either indirectly or directly with heat from any source available. One preferred method for preheating the crushed carbonaceous feed stream utilizes the residual sensible heat of flue gases previously employed in the process to supply heat to the heat-body heating zone. In such cases the technique preferred for utilization is to effect the desired heat transfer between the crushed raw material and the hot flue gases by entraining the carbonaceous solids in a gas lift line with the flue gas stream. The pre-heated raw material is then separated from the entraining gas in a gas-solids separation zone and passed to the pyrolysis zone.

The cool or preheated carbonaceous material is then passed into a pyrolysis zone which is in the form of a horizontal or slightly inclined rotating drum wherein it is contacted in solid-to-solid milling contact with heat-carrying bodies having sufficient available heat to effect the desired degree of pyrolysis of the carbonaceous material and produce effluent vapor and hot spent solid residues. Preferably, the available heat of the heat-carrying bodies is such that essentially complete pyrolysis of the carbonaceous solids is effected with a maximum yield of hydrocarbon values being thereby achieved. For example, when oil shale is treated in accordance with the method of the invention, the heat supplied by the heat-carrying bodies to the oil shale is such as to raise the temperature of the shale in the range of from about 750° to about 950° F., preferably from about 800° to about 900° F. Temperatures in the pyrolysis zone greater than about 950° F. are to be avoided due to the fact that some slight cracking of valuable hydrocarbon product undesirably may occur under such conditions.

Although countercurrent flow of solids through the pyrolysis zone may be employed, in accordance with the preferred embodiment of the present method, the carbonaceous materials and heat-carrying bodies are passed through the pyrolysis drum in concurrent fashion. By the utilization of concurrent flow in lieu of countercurrent flow, the power requirements for moving the solids through the system are greatly reduced and the chance of slight coking occurring at the heat-carrying body inlet end of the pyrolysis drum is essentially eliminated.

The actual temperature and amount of the heat-bodies introduced into the pyrolysis zone in a particular embodiment of the present method will depend upon, inter alia, the type of carbonaceous material being treated, the degree of pyrolysis desired, the inlet temperature of the carbonaceous feed, and the heat transfer characteristics of the heat-carrying bodies. Where oil shale is treated in accordance with the method of the invention wherein alumina balls are utilized as the heat-carrying bodies, the ratio of heat-carrying bodies to raw shale feed to the pyrolysis zone usually is in the range of from about 0.6:1 to about 10:1, preferably from about 0.8:1 to about 3:1. In such oil shale treatments the alumina balls introduced into the pyrolysis zone usually are at a temperature in the range of from about 1200° to about 1800° F., preferably from about 1350° to about 1650° F.

Heat-carrying bodies cooled by giving up a portion of their heat for the pyrolysis, effluent vapor and spent materials produced in the pyrolysis of the carbonaceous solids are then removed from the pyrolysis zone. The effluent vapor suitably may be immediately separated from the other materials issuing from the pyrolysis zone and sent to a recovery section wherein the desired portions or fractions thereof are recovered. Since the effluent vapor contains fine solid materials from the pyrolysis suspended therein, preferably the vapor recovered from the pyrolysis zone preliminary to being sent to the recovery section is treated for dust removal.

The desired dust removal suitably may be carried out by any expedient means, but in the preferred embodiment of the method of the invention, the effluent vapor is passed to a dust removal zone wherein it is maintained in contact for a period with cool heat-carrying bodies previously recovered from the pyrolysis zone and then passed through a conventional gas-solids separator located within the ball-containing region of the dust removal zone. Part of the solids are removed from the vapor by contact with the heat-carrying bodies. It is believed that by contact electrification, effected by previous particle-to-particle contact in the process, the dust and heat-carrying bodies have become differentially charged and that for this reason a portion of the dust particles are attracted to and thereby removed from the vapor by the heat-carrying bodies. The remainder of the dust entrained in the effluent vapor substantially is separated therefrom in the gas-solids separator wherein condensation of the effluent vapor is precluded due to the heat supplied externally to the separator by the heat bodies in the dust removal zone.

If the hot spent solids and cooled heat-carrying bodies produced in the pyrolsis zone have not already been separated inside the pyrolysis zone, as is described in U.S. Patent 2,592,738, separation of the spent materials and heat-carrying bodies recovered from the pyrolysis zone is then carried out by any suitable means such as by a screening means and the like. Separation of the spent materials and heat-carrying bodies easily can be accomplished due to the fact that there is a significant difference in the average particle size between the two solid streams.

The separated cool heat-carrying bodies then may be sent directly to a pebble heater wherein they are reheated for recirculation to the pyrolysis zone to contact fresh carbonaceous material introduced thereto. As stated hereinabove, in the preferred embodiment of the method of the present invention the cooled heat-carrying bodies recovered from the pyrolysis zone prior to being passed to the pebble heater for reheating are sent to a dust removal zone for treating the effluent vapor therein.

Cooled heat-carrying bodies recovered from the pyrolysis zone or recovered from the dust removal zone then are passed to the heat-carrying body reheating zone consisting of a pebble heater by any suitable means such as by mechanical conveyors, pneumatic transmission lines and the like. The heat-carrying bodies to be reheated are introduced into the top of the pebble heater which may be of any suitable type wherein the heat-carrying bodies are reheated by being contacted with flue gases having heat value derived from the sensible heat of the spent solids and the combustion heat of a fuel other than the residual carbon in the spent solids.

The sensible heat of the spent solids and the combustion heat of the fuel may be imparted to the flue gas employed to reheat the heat-carrying bodies in any suitable manner by any suitable means. In accordance with the preferred method of the present invention, a combustion-supporting gas initially is preheated by means of the sensible heat of the spent materials and subsequently the resulting preheated combustion-supporting gas is employed to burn the fuel to provide a flue gas having the desired pebble heater inlet temperatures. Any suitable technique can be employed to impart the sensible heat of the spent solids produced in the pyrolysis to the combustion-supporting gas. Suitable methods for accomplishing this purpose include effecting heat transfer between the spent solids and combustion-supporting gas in a fluidized solids unit, a pebble heater, an entrained-solids gas lift line and the like. In the preferred embodiment of the method of the present invention the spent solids recovered from the pyrolysis zone are introduced into and entrained in a gas lift line by a combustion-supporting gas such as air, oxygen-containing flue gas and the like, with the combustion-supporting gas being thereby heated. The spent solids then are removed from the heated combustion-supporting gas in a suitable gas-solids separator, such as one of the cyclone type, and the resultant heated solids-free gas is employed to ignite and burn the fuel to provide the flue gas utilized for heating the heat-carrying bodies.

Although the above description of the gas employed to recover the sensible heat of the spent solids is limited to a combustion-supporting gas, it will, of course, be understood that a non-combustion-supporting gas suitably could be used for this purpose and subsequently a requisite supply of oxygen could then be introduced into the resulting preheated non-combustion-supporting gas to provide a suitable medium for burning the fuel.

Although any fuel other than the carbon present in the spent solids suitably may be employed as the fuel in the heat-carrying body heating step of the process, the fuel preferred to be burned is a portion of the effluent vapor produced in the pyrolysis step of the process from which the least economic benefit can be gained by attempting to market it. Generally, the portion recovered from the effluent vapor having the least value on the market is a gas oil fraction and, therefore, the gas oil fraction constitutes the preferred embodiment of the fuel employed in the heat-carrying body reheating step. When a portion of the effluent is employed as the fuel, the portion suitably may be recovered therefrom with or without fractionation. Of course, other fuels which are either normally solids, liquids or gases such as coal, petroleum oil stocks, non-condensible gases produced in the process, or natural gas suitably could be employed in the process either alone, in combination with each other, or in combination with portions of the effluent produced in the process.

Combustion of the fuel in the preheated combustion-supporting gas provides hot flue gases which are then introduced into the bottom of a pebble heater and passed upwardly through the bed of heat-carrying bodies therein thereby imparting their heat to the heat carrying bodies. The amount of the fuel which must be combusted in order to fulfill the heat requirements of the process can be determined by a heat balance on the over-all system considering, inter alia, the total heat requisite for achieving the desired degree of pyrolysis, the potential heat value of the fuel, the proportion of the sensible heat of the spent solids which can be recovered, and the heat exchange efficiency of the pebble heater. The heat requirements for a particular embodiment of the present invention, therefore, will vary depending upon the type of carbonaceous material being thermally treated, and the particular heat-carrying bodies, fuel, and apparatus employed in the system.

Reheated heat-carrying bodies are recovered from the bottom of the pebble heater and recirculated to the pyrolysis zone by any suitable means such as by gravity, mechanical conveyance, pneumatic transmission and the like. The flue gases still characterized by some residual heat value are recovered from the top of the pebble heater and suitably may be used in the system as a heating expedient. As hereinabove stated, in the preferred embodiment of the method of the invention the fuel gases obtained overhead from the pebble heater are employed in a raw carbonaceous material gas lift heater.

The invention will be more fully understood by reference to the following detailed description of an example of the more preferred embodiment of the method of the invention and the accompanying drawing which represents a flow diagram of the method so described wherein Colorado oil shale is employed as the feed stream.

Colorado oil shale at about 50° F. crushed to an average particle size of about ½″ in diameter is fed from a bin 1 via line 2 and feeder 3 to a raw shale lift heater 4 wherein it is contacted and entrained by flue gas having a temperature of about 1100° F. In the raw shale lift heater, the raw shale feed is heated to a temperature of about 300° F. The preheated raw shale is then removed from the gas-solids suspension in a separator 5 and passed to a horizontal rotating pyrolysis drum 8 via line 6. The cooled flue gas from which the heated raw shale has been removed passes from gas-solids separation zone 5 through line 7 and is vented to the atmosphere.

In pyrolysis zone 8, the preheated raw shale is contacted with hot alumina balls having a temperature of about 1570° F. and entering pyrolysis drum 8 via line 9 and feeder 10. The balls and shale pass concurrently through pyrolysis drum 8 whereby the heat of the balls is imparted to the shale with the production of an effluent vapor and spent shale solids. Effluent vapor and spent solids at about 870° F. and cooled balls at about 900° F. exit from pyrolysis drum 8 through line 11 which is adapted with a screen 12 having openings therein such that spent solids pass through while the passage of balls is precluded. The effluent vapor and cooled balls are then passed by means of line 11 to a bin 14 wherein the vapor and balls are allowed to remain in contact for a longer period whereby the removal of dust from the effluent vapor is achieved. Substantially dust-free vapor is removed from bin 14 through line 16 and passed to a recovery section which is not shown. Cooled balls are removed from bin 14 by means of line 15 and passed to a ball elevator 18 via feeder 17. In ball elevator 18 the cooled balls are lifted to the top of a pebble heater 20 into which they are introduced from elevator 18 by means of line 19.

The spent shale solids removed from pyrolysis drum 8 and separated from the cooled balls by means of screen 12 are passed via line 13 to a gas lift line 24. In gas lift line 24 the hot spent shale is contacted and entrained by means of air at about 95° F. introduced into lift line 24 through a blower-compressor 25. The entrained spent shale imparts its sensible heat to the air thereby raising the temperature of the solids lifting medium to about 700° F. The air-spent solids suspension is then passed through a separator 26 wherein the entrained solids are removed from the air stream. The separated solids pass from solid separator 26 through line 27 and are discarded. The heated air from which the spent solids have been removed pass from separator 26 by means of line 28 and are introduced into the bottom of pebble heater 20 via a fuel combustion zone 50 located at the inlet of line 28 to ball heater 20. A gas oil fraction recovered from the effluent vapor produced in the process is introduced by means of line 29 into fuel combustion zone 50 wherein it is ignited and burned by the preheated air. The flue gas produced by burning the gas oil fraction and having a temperature of about 3000° F. is then passed upwardly through ball heater 20 to contact and heat balls introduced thereinto. Heated balls leave ball heater 20 through line 21 and are recirculated to pyrolysis drum 8 via line 9 and feeder 10 to contact and effect the pyrolysis of additional raw shale. Flue gas having a temperature of about 1100° F. is removed from the top of ball heater 20 by means of line 22 and passed to lift heater 4 wherein it contacts and preheats a stream of additional raw shale feed.

As referred to in the specification hereinabove and in the claims, a pebble heater is a chamber containing a bed of granular material moving downwardly through a chamber countercurrent to a heat exchange medium. Although some fluidization of the material in the chamber suitably may occur, it is preferred that the granular material be present in the chamber in the form of a packed bed.

Since modifications of the method of the invention which do not depart from its scope will become apparent from the general description and specific embodiments appearing in the specifications, it is intended that this invention be limited solely by the scope of the appended claims.

What is claimed is:

1. A method for producing an effluent vapor from a solid carbonaceous material leaving, upon pyrolysis, a spent solid residue, which comprises the steps of: pyrolyzing said solid material in a pyrolysis zone by solid-to-solid milling contact with hotter heat-carrying bodies to obtain effluent vapor and hot spent solids; recovering said effluent vapor from said pyrolysis zone; separating said hot spent solids from said heat-carrying bodies; transferring said heat-carrying bodies to a pebble heater; preheating a combustion-supporting gas with the sensible heat of said hot spent solids under non-combustion conditions; combusting a fuel other than the residual carbon in the hot spent solids with said preheated combustion-supporting gas to produce a hot flue gas; passing said hot flue gas through said pebble heater to thereby heat said heat-carrying bodies therein; and recirculating said heated heat-carrying bodies to said pyrolysis zone to effect the pyrolysis of fresh solid carbonaceous material introduced thereinto.

2. The method according to claim 1 wherein said fuel is a portion of said effluent vapor produced upon the pyrolysis of said solid carbonaceous material.

3. The method according to claim 1 wherein said solid carbonaceous material leaves upon pyrolysis a spent solid residue containing less than about 5% by weight combustible matter.

4. The method according to claim 1 wherein said solid carbonaceous material is oil shale.

5. The method according to claim 1 wherein said solid carbonaceous material and said heat-carrying bodies are passed concurrently through said pyrolysis zone.

6. The method according to claim 1 wherein said flue gases passed through said pebble heater are recovered and the residual sensible heat thereof is employed to preheat said solid carbonaceous material prior to said material being introduced into said pyrolysis zone.

7. A method for producing effluent vapor from a solid carbonaceous material leaving, upon pyrolysis, a spent solid residue, which comprises the steps of: pyrolyzing said solid material in a pyrolysis zone by solid-to-solid milling contact with hotter heat-carrying bodies to obtain effluent vapor and hot spent solids smaller in diameter than said heat-carrying bodies; recovering said effluent vapor from said pyrolysis zone; separating said hot spent solids from said heat-carrying bodies; transferring said heat-carrying bodies to a pebble heater; entraining at least a part of said hot spent solids in a gas lift zone with a cooler combustion-supporting gas, said gas being heated thereby; separating said spent solids in an unburned state from said heated combustion-supporting gas; combusting a portion of said effluent vapor produced upon the pyrolysis of said solid carbonaceous material with said heated gas to produce a hot flue gas; passing said hot flue gas through said pebble heater to thereby heat said heat-carrying bodies therein; and recirculating said heated heat-carrying bodies to said pyrolysis zone to effect the pyrolysis of fresh solid carbonaceous material introduced thereinto.

8. The method according to claim 7 wherein said solid carbonaceous material leaves upon pyrolysis a spent solid residue containing less than about 5% by weight combustible matter.

9. The method according to claim 7 wherein said solid carbonaceous material is oil shale.

10. The method according to claim 7 wherein said solid carbonaceous material and said heat-carrying bodies are passed concurrently through said pyrolysis zone.

11. The method according to claim 7 wherein said flue gases passed through said pebble heater are recovered and the residual sensible heat thereof is employed to preheat said solid carbonaceous material prior to said material being introduced into said pyrolysis zone.

12. A method for producing effluent vapor from a solid carbonaceous material leaving, upon pyrolysis, a spent solid residue containing less than about 5% by weight combustible matter, which comprises the steps of: pyrolyzing said solid material in a pyrolysis zone by solid-to-solid milling contact with hotter heat-carrying bodies to obtain effluent vapor and hot spent solids smaller in diameter than said heat-carrying bodies; recovering said effluent vapor from said pyrolysis zone; separating said hot spent solids from said heat-carrying bodies; transferring said heat-carrying bodies to a pebble heater; entraining at least a part of said hot spent solids in a gas lift zone with a cooler combustion-supporting gas, said gas being heated thereby; separating said spent solids in an unburned state from said heated combustion-supporting gas; combusting a portion of said effluent vapor produced upon the pyrolysis of said solid carbonaceous material with said heated gas to produce a hot flue gas; passing said hot flue gas through said pebble heater to thereby heat said heat-carrying bodies therein; and recirculating said heated heat-carrying bodies to said pyrolysis zone to effect the pyrolysis of fresh solid carbonaceous material introduced thereinto.

13. The method according to claim 12 wherein said solid carbonaceous material is oil shale.

14. The method according to claim 12 wherein said solid carbonaceous material and said heat-carrying bodies are passed concurrently through said pyrolysis zone.

15. The method according to claim 12 wherein said flue gases passed through said pebble heater are recovered and the residual sensible heat thereof is employed to preheat said solid carbonaceous material prior to said material being introduced into said pyrolysis zone.

16. A method for producing effluent vapor from oil shale leaving, upon pyrolysis, spent shale, which comprises the steps of: pyrolyzing said oil shale in a pyrolysis zone by solid-to-solid milling contact with hotter heat-carrying bodies to obtain effluent vapor and hot spent shale smaller in diameter than said heat-carrying bodies; recovering said effluent vapor from said pyrolysis zone; separating said hot spent shale from said heat-carrying bodies; transferring said heat-carrying bodies to a pebble heater; entraining at least a part of said hot spent shale in a gas lift zone with a cooler combustion-supporting gas, said gas being heated thereby; separating said spent shale in an unburned state from said heated combustion-supporting gas; combusting a portion of said effluent vapor produced upon the pyrolysis of said oil shale with said heated gas to produce a hot flue gas; passing said hot flue gas through said pebble heater to thereby heat said heat-carrying bodies therein; and recirculating said heated-heat-carrying bodies to said pyrolysis zone to effect the pyrolysis of fresh oil shale introduced thereinto.

17. The method according to claim 16 wherein said oil shale leaves upon pyrolysis a spent shale containing less than about 5% by weight combustible matter.

18. The method according to claim 16 wherein said oil shale and said heat-carrying bodies are passed concurrently through said pyrolysis zone.

19. The method according to claim 16 wherein said heat-carrying bodies are in the form of alumina balls.

20. The method according to claim 16 wherein said portion of said effluent vapor which is combusted is a gas oil fraction.

21. The method according to claim 16 wherein said flue gases passed through said pebble heater are recovered and the residual sensible heat thereof is employed to preheat said oil shale prior to said oil shale being introduced into said pyrolysis zone.

22. A method for producing effluent vapor from oil shale leaving, upon pyrolysis, spent shale containing less than about five percent by weight combustible matter, which comprises the steps of: pyrolyzing said oil shale in a pyrolysis zone by solid-to-solid milling contact concurrently through said pyrolysis zone with hotter heat-carrying bodies in the form of alumina balls to obtain effluent vapor and hot spent shale smaller in diameter than said heat-carrying bodies; recovering said effluent vapor from said pyrolysis zone; separating said hot spent shale from said heat-carrying bodies; transferring said heat-carrying bodies to a pebble heater; entraining at least a part of said hot spent shale in a gas lift zone with a cooler combustion-supporting gas, said gas being heated thereby; separating said spent shale in an unburned state from said heated combustion-supporting gas; combusting at least a portion of the gas oil fraction of said effluent vapor produced upon the pyrolysis of said oil shale with said heated gas to produce a hot flue gas; passing said hot flue gas through said pebble heater to thereby heat said heat-carrying bodies therein; recovering flue gases exhausted from said pebble heater; employing the residual sensible heat of said exhausted flue gases to preheat fresh oil shale prior to its introduction into said pyrolysis zone; and recirculating said heated heat-carrying bodies to said pyrolysis zone to effect the pyrolysis of said preheated fresh oil shale introduced thereinto.

23. A method for producing an effluent vapor from a solid carbonaceous material leaving, upon pyrolysis, a spent solid residue, which comprises the steps of: pyrolyzing said solid material in a pyrolysis zone by solid-to-solid milling contact with hotter heat-carrying bodies to obtain effluent vapor and hot spent solids; recovering said effluent vapor from said pyrolysis zone; separating said hot spent solids from said heat-carrying bodies; transferring said heat-carrying bodies to a pebble heater; entraining at least a part of said hot spent solids in a gas lift zone with a cooler combustion-supporting gas, said gas being heated thereby; separating said spent solids in an unburned state from said heated combustion-supporting gas; combusting a fuel other than the residual carbon in the spent solids with said heated gas to produce a hot flue gas; passing said hot flue gas through said pebble heater to thereby heat said heat-carrying bodies therein, and recirculating said heated heat-carrying bodies to said pyrolysis zone to effect the pyrolysis of fresh solid carbonaceous material introduced thereinto.

References Cited by the Examiner

UNITED STATES PATENTS

| | | | |
|---|---|---|---|
| 1,732,219 | 10/1929 | Bjerregaard | 201—13 |
| 2,814,587 | 11/1957 | Van Dijck | 208—11 |
| 2,885,338 | 5/1959 | Evans | 208—11 |
| 2,982,701 | 5/1961 | Scott | 202—6 |
| 3,008,894 | 11/1961 | Culbertson | 208—11 |
| 3,034,979 | 5/1962 | Nevens | 208—11 |

DELBERT E. GANTZ, *Primary Examiner.*

ALPHONSO D. SULLIVAN, PAUL M. COUGHLAN,
*Examiners.*

H. LEVINE, *Assistant Examiner.*